United States Patent [19]

Kornis et al.

[11] 3,849,106

[45] Nov. 19, 1974

[54] HERBICIDAL COMPOSITION AND METHOD

[75] Inventors: Gabriel Kornis; Arnolds Steinhards; Eldon George Nidy; Henry J. Vostral, all of Kalamazoo, Mich.

[73] Assignee: The Upjohn Company, Kalamazoo, Mich.

[22] Filed: Mar. 4, 1970

[21] Appl. No.: 16,577

[52] U.S. Cl............................ 71/92, 71/66, 71/88, 71/90, 71/94, 260/243 B, 260/247.2 B, 260/268 H, 260/293, 260/310 R
[51] Int. Cl............................................. A01n 9/22
[58] Field of Search............... 71/66, 92, 90, 88, 94

[56] References Cited
UNITED STATES PATENTS

| | | | |
|---|---|---|---|
| 2,075,359 | 3/1937 | Salzberg et al. | 424/330 |
| 3,494,757 | 2/1970 | Osborne | 71/54 |

FOREIGN PATENTS OR APPLICATIONS

| | | | |
|---|---|---|---|
| 39-23,740 | 10/1964 | Japan | 71/92 |

*Primary Examiner*—James O. Thomas, Jr.
*Attorney, Agent, or Firm*—Carl A. Randles, Jr.; Roman Saliwanchik

[57] ABSTRACT

Certain new aminoalkyl esters of di- and trihalopyrazole-1-alkanoic and -1-alkenoic acids have been synthesized. The free bases as well as their acid addition salts and quaternary ammonium salts possess herbicidal and plant growth regulatory activity. The new compounds are prepared and isolated by conventional chemical reactions and procedures. Weed control methods and compositions for herbicidal use are also described.

6 Claims, No Drawings

HERBICIDAL COMPOSITION AND METHOD

SUMMARY OF THE INVENTION

This invention pertains to new organic compounds, to a process for preparing the same, to a new method for controlling weeds, and to new herbicidal compositions. The invention is more particularly directed to new aminoalkyl esters of di- and trihalopyrazole-1-alkanoic and -1-alkenoic acids, including acid addition and quaternary ammonium salts thereof; to a process for preparing the same; to a new method of controlling weeds with the aminoalkyl esters of this invention; and to new herbicidal compositions containing the same.

The new aminoalkyl esters of di- and trihalopyrazole-1-alkanoic and -1-alkenoic acids of this invention have the general structural formula:

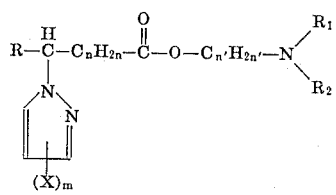

wherein $n$ is an integer 0, 1, 2, or 3; X is a halogen atom; $m$ is the integer 2 or 3, the halogen atoms being selected independently; R is hydrogen, alkyl of from one to 10 carbon atoms, inclusive, or alkenyl of from two to 10 carbon atoms, inclusive, the sum of the carbon atoms in the group

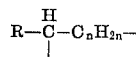

being not more than 11; "$-C_{n'}H_{2n'}-$" is alkylene of from two to eight carbon atoms, inclusive ($n'$ being an integer from 2 to 8, inclusive); and $R_1$ and $R_2$ are individually and collectively defined as follows:

Individually, $R_1$ and $R_2$ are lower-alkyl of from one to eight carbon atoms, inclusive; alkenyl of from three to 8 carbon atoms, inclusive; aralkyl of from seven to 13 carbon atoms, inclusive; cycloalkyl of from three to 8 carbon atoms, inclusive; cycloalkenyl of from four to eight carbon atoms, inclusive; and Collectively, the

group is a saturated heterocyclic amino group of from three to seven ring atoms, inclusive, having a total of not more than 15 carbon atoms.

DETAILED DESCRIPTION OF THE INVENTION

The foregoing general structural formula and definition of variables provide a broad outline of the scope of this invention. This scope can be more readily recognized by consideration of some specific variations. Accordingly, some specific lower-alkyl groups of from one to eight carbon atoms, inclusive, are for example: methyl, ethyl, propyl, butyl, pentyl, hexyl, heptyl, octyl, and isomeric forms thereof. Alkyl groups of from one to 10 carbon atoms, inclusive, are those already given, and also nonyl, decyl, and isomeric forms thereof.

Some specific alkenyl groups of from three to eight carbon atoms, inclusive, are for example: allyl, 1-methylallyl, 2-methylallyl (methallyl), 2-butenyl (crotyl), 3-butenyl, 1,2-dimethylallyl, 3-methyl-2-butenyl, 3-pentenyl, 2,3-dimethyl-2-butenyl, 1,1,2-trimethylallyl, 1,3-dimethyl-2-butenyl, 1-ethyl-2-butenyl, 4-methyl-2-pentenyl, 2-ethyl-2-pentenyl, 4,4-dimethyl-2-pentenyl, 2-heptenyl, 2-octenyl, 5-octenyl, 1,4-dimethyl-4-hexenyl, and the like. Alkenyl groups of from two to 10 carbon atoms, inclusive, are those already given, and also vinyl, 2-nonenyl, 2-decenyl, and the like.

Some specific aralkyl groups of from seven to 13 carbon atoms, inclusive, are for example: benzyl, phenethyl, 1-phenylethyl, 2-phenylpropyl, 4-phenylbutyl, 6-phenylhexyl, 5-phenyl-2-methylpentyl, benzhydryl, 1-naphthylmethyl, 2-(1-naphthyl)ethyl, 2-(2-naphthyl)ethyl, and the like.

The phrase cycloalkyl of from three to eight carbon atoms, inclusive, includes for example, cyclopropyl, 2-methylcyclopropyl, 2,2-dimethylcyclopropyl, 2,3-diethylcyclopropyl, 2-butylcyclopropyl, cyclobutyl, 2-methylcyclobutyl, 3-propylcyclobutyl, 2,3,4-trimethylcyclobutyl, cyclopentyl, 2,2-dimethylcyclopentyl, cyclohexyl, 3-methylcyclohexyl, 2,2-dimethylcyclohexyl, cycloheptyl, cyclooctyl, and the like.

Cycloalkenyl groups of from four to eight carbon atoms, inclusive, are for example, 2-cyclobutenyl, 3-cyclopentenyl, 3-cyclohexenyl, 2-ethyl-3-cyclohexenyl, and the like.

The alkylene group "$-C_{n'}H_{2n'}-$" is preferably one having two or three carbon atoms between the valences, but any branched or straight chain alkylene group of from two to eight carbon atoms is satisfactory. The alkylene group can be ethylene, propylene, trimethylene, ethylethylene, tetramethylene, hexamethylene, octamethylene, 1-butyltrimethylene, and the like.

The phrase "saturated heterocyclic amino group of from three to seven ring atoms, inclusive, having a total of not more than 15 carbon atoms," includes for example, aziridinyl, lower-alkylaziridinyl, for example, 2-methylaziridinyl, 2-ethylaziridinyl, and 2-butylaziridinyl, polylower-alkylaziridinyl, for example, 2,3-dimethylaziridinyl and 2,2-dimethylaziridinyl, azetidinyl, lower-alkylazetidinyl, for example, 2-methylazetidinyl, 3-methylazetidinyl, and 2-octylazetidinyl, polylower-alkylazetidinyl, for example, 2,2-dimethylazetidinyl, 3,3-diethylazetidinyl, 2,4,4-trimethylazetidinyl, and 2,3,4-trimethylazetidinyl, pyrrolidinyl, lower-alkylpyrrolidinyl, for example, 2-methylpyrrolidinyl, 3-butylpyrrolidinyl, and 2-isohexylpyrrolidinyl, polylower-alkylpyrrolidinyl, for example, 2,3-dimethylpyrrolidinyl, 2,2-dimethylpyrrolidinyl, 2,5-diethylpyrrolidinyl, and 2,3,5-trimethylpyrrolidinyl, piperidino, lower-alkylpiperidino, for example, 2-methylpiperidino, 3-methylpiperidino, 4-methylpiperidino, 3-isopropylpiperidino, and 4-tert-butylpiperidino, polylower-alkylpiperidino, for example, 3,4-diethylpiperidino, 2-methyl-5-ethylpiperidino, 3,5-dipentylpiperidino, 2,4,6-trimethylpiperidino, and 2,3,5-triethylpiperidino, hexamethyleneimino, lower-alkylhexamethyleneimino, for example, 2-ethylhexamethyleneimino, 4-tert-butylhexamethyleneimino, and 3-heptylhexamethyleneimino, polylower-alkylhexamethyleneimino, for example, 2,4-dimethylhexamethyleneimino, 3,3-dimethylhexamethyleneimino, 2,4,6-tripropylhexamethyleneimino, and 2,2-dibutylhexamethyleneimino, 4-lower-alkylpiperazinyl, for example, 4-methylpiperazinyl and 4-isopropylpiperazinyl, polylower-alkylpiperazinyl, for example, 2,2,4,5,5-pentamethylpiperazinyl and 2,4,5-trimethylpiperazinyl, morpholino, lower-alkylmorpholino, for example, 2-ethylmorpholino and 3-isobutylmorpholino, polylower-alkylmorpholino, for example, 2-ethyl-5-methylmorpholino, 3,3-dimethylmorpholino, and 2,6-di-tert-butylmorpholino, thiamorpholino, lower-alkylthiamorpholino, for example, 3-methylthiamorpholino, and polylower-alkylthiamorpholino, for example, 2,3,6-trimethylthiamorpholino and 2,3,5,6-tetramethylthiamorpholino.

The foregoing specified and many other like saturated heterocyclic amino groups are contemplated as being within the scope of this invention. It will be noted that the saturated amino heterocycle can be other than alkyleneamino and there can be a second hetero atom in the ring, i.e., an oxygen atom, a sulfur atom, or a second nitrogen atom as a ring member. In general, the second hetero atom is preferably in the 4-position of a six-membered ring, but it can be in the 3-position. Accordingly, referring to the phrase "Collectively, the

group is a saturated heterocyclic amino group of from three to seven ring atoms, inclusive," it will be recognized that the $R_1$ and $R_2$ chain can be alkylene, oxadialkylene, e.g.,

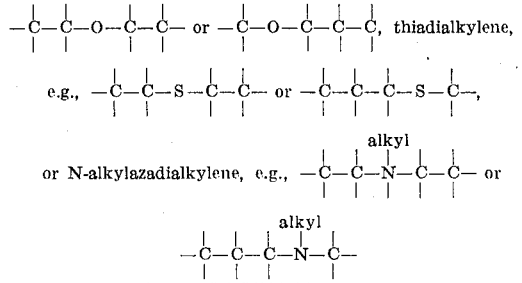

Accordingly, a further definition of the phrase is: Collectively, $R_1$ and $R_2$ taken as a unit with the

atom, are saturated heterocyclic amino groups of from three to seven ring atoms, inclusive, each group having a total of not more than 15 carbon atoms, one of the ring atoms being selected from carbon, oxygen, sulfur, or a second nitrogen atom, the other ring atoms being carbon, so that $R_1$–$R_2$ as a unit, is alkylene, oxadialkylene, thiadialkylene, or N-alkylazadialkylene, respectively.

The new aminoalkyl di- and trihalopyrazole-1-alkanoates and -1-alkenoates of this invention (compounds of Formula I) are conveniently prepared by reacting an acid halide, preferably the chloride, of a di- or trihalopyrazole-1-alkanoic or -1-alkenoic acid having the structural formula:

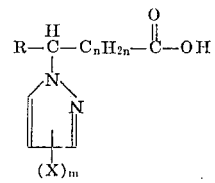

wherein $n$, X, $m$ and R are as previously defined, with an N,N-di-substituted aminoalkanol having the structural formula:

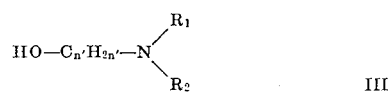

wherein $-C_{n'}H_{2n'}-$, $R_1$ and $R_2$ are as previously defined.

This reaction is preferably effected at a temperature between about 50° and 150° C. in the presence of an inert organic reaction medium and an acid binding agent. If desired, an excess of the aminoalkanol reactant can be used to bind the hydrogen halide released by the esterification, or a tertiary amine such as triethylamine, pyridine, picoline or the like can be used. Representative suitable inert organic reaction media include toluene (preferred), benzene, xylene, and the like.

Alternatively, the new aminoalkyl di- and trihalopyrazole-1-alkanoates and -1-alkenoates of Formula I can be prepared by reacting a di- or trihalopyrazole-1-alkanoic or -1-alkenoic acid (Formula II) with an N,N-disubstituted aminoalkanol (Formula III) in the presence of an inert organic reaction medium of the kind mentioned above. Conveniently, the esterification is accomplished by heating the acid and the aminoalkanol at a temperature of about 100° to 125° C., in the presence of a catalyst, for example, p-toluenesulfonic acid, azeotroping the water formed by the reaction, and recovering the basic ester according to conventional methods.

Representative N,N-disubstituted aminoalkanols include 2-(dimethylamino)ethanol, 2-(diethylamino)ethanol, 2-(dipropylamino)ethanol, 2-(dibutylamino)ethanol, 2-diethylamino-1-methylethanol, 3-diethylamino-1-propanol, 4-diethylamino-1-butanol, 2-morpholinoethanol, 2-piperidinoethanol, 2-pyrrolidinoethanol, 8-hexamethyleneimino-1-octanol, 2-(4-methylpiperazino)ethanol, 3-thiomorpholino-1-propanol, 2-(diallylamino)ethanol, 2-(dicyclohexylamino)ethanol, 5-methylbenzylamino-1-pentanol, and the like.

Acid halides of the above Formula II di- and trihalopyrazole-1-alkanoic and -1-alkenoic acids can be prepared by means commonly used for converting carboxylic acids to their acid halides, for example, by reaction of an acid with thionyl chloride.

The di- and trihalopyrazole-1-alkanoic and -1-alkenoic acids of Formula II are prepared from their alkyl esters, preferably methyl or ethyl esters, by conventional alkaline hydrolysis. If desired, the alkyl di- or trihalopyrazole-1-alkanoate or -1-alkenoate is hydrolyzed with an alkali metal hydroxide in the reaction mixture in which it is formed, and the alkanoic or alkenoic acid is recovered by adding strong acid to neutralize the base and to precipitate the desired di- or trihalopyrazole-1-alkanoic or -1-alkenoic acid of Formula II.

The alkyl di- and trihalopyrazole-1-alkanoates and -1-alkenoates, i.e., alkyl esters of Formula II alkanoic and alkenoic acids, are prepared by reacting an alkali metal salt (preferably a sodium or potassium salt) of a di- or trihalopyrazole with an alkyl haloalkanoate or haloalkenoate. A representative formula of suitable alkyl haloalkanoates and haloalkenoates is as follows:

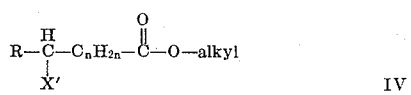

IV wherein $n$ and R are as previously defined, X′ is chlorine, bromine, or iodine, and "alkyl" preferably is methyl or ethyl.

In accordance with a preferred process, the di- and trihalopyrazole-1-alkanoic and -1-alkenoic acids of Formula II are prepared by first reacting a di- or trihalopyrazole with an alkyl haloalkanoate or haloalkenoate (according to Formula IV) in the presence of an alkali metal carbonate such as potassium carbonate or sodium carbonate and acetone, and then hydrolyzing the thus-produced ester to the corresponding acid.

The di- or trihalopyrazole is dissolved in acetone and a solid anhydrous alkali metal carbonate is added. The mixture is heated for a few minutes, then cooled, and the alkyl haloalkanoate or haloalkenoate is added. After further heating at the reflux temperature and cooling, aqueous alkali metal hydroxide is added, the acetone is removed and the reaction mixture is reheated to the reflux temperature to effect hydrolysis. The solution that results containing di- or trihalopyrazole-1-alkanoic or -1-alkenoic acid alkali metal salt is acidified to precipitate the free acid. The free acid is collected on a filter, washed free of salts, and dried.

The new aminoalkyl di- and trihalopyrazole-1-alkanoates and -1-alkenoates of this invention are represented in Formula I, above, in the free base form. Those skilled in the art, however, will note that the amino group can associate with the hydrogen ions of a dissociated acid to form stable acid addition salts. Hence, the stable acid addition salts are contemplated as an embodiment of the invention. The acid addition salts of this invention are in general crystalline solids, are readily prepared, and are a convenient form of the new compounds for many purposes. The free base, new compounds also form quaternary ammonium salts.

All forms, i.e., the free base form, the acid addition salt form, and the quaternary ammonium salt form are useful as herbicides and plant growth regulants in accordance with the invention.

The acid addition salts embodiment of the compounds of this invention affords a convenient means of obtaining the free base compounds in pure form. The pure free base compounds can be obtained from an acid addition salt by neutralizing the acid with a base and recovering the free base according to conventional methods. Likewise, the acid addition salts of the invention are convenient means of obtaining the compounds in crystalline form, and for minimizing decomposition of the free bases.

Acid addition salts are also a convenient form of the compounds of the invention for assuring solubility in aqueous media. This quality of the acid addition salts can be an especially important factor in the herbicidal method of this invention. All acid addition salts are useful as herbicides as long as the acid anion does not interfere with the desired herbicidal effect of the free base.

The hydrochlorides of the compounds of Formula I are representative, readily prepared and preferred acid addition salts according to the invention. The hydrochlorides are obtained by using hydrochloric acid or anhydrous hydrogen chloride. Other representative mineral acid addition salts are the hydrobromides, the hydroiodides, the sulfates, the phosphates, the hexafluorophosphates, the nitrates, the trichloroacetates, the arsenates and the fluosilicates. Representative organic acid addition salts are the acetates, the propionates, the benzoates, the salicylates, the glycolates, the succinates, the nicotinates, the tartrates, the maleates, the malates, the oxalates, the pamoates, the methanesulfonates, the dodecylbenzenesulfonates, the arsanilates, the picrates, and the lactates.

The fluosilicic acid addition salts of the aminoalkyl di- and trihalopyrazole-1-alkanoates and -1-alkenoates of this invention are useful as mothproofing agents in accordance with U.S. Pat. Nos. 1,915,334 and 2,075,359. The thiocyanic acid addition salts are useful for condensing with formaldehyde in accordance with U.S. Pat. Nos. 2,425,320 and 2,606,155 to form amine thiocyanate-formaldehyde condensation products for use as pickling inhibitors.

The quaternary ammonium salts embodiment of the compounds of this invention are obtained by reacting the free base with organic esters of acids such as hydrohalic acids. Representative organic esters include methyl bromide, methyl iodide, methyl chloride, ethyl bromide, propyl chloride, ethylene bromohydrin, ethylene chlorohydrin, propylene chlorohydrin, benzyl chloride, phenethyl bromide, allyl bromide, methallyl bromide, crotyl bromide, and the like.

The following Preparations and Examples are illustrative of the process and products of the present invention but are not to be construed as limiting.

Preparation 1 — Preparation of Ethyl 3,4,5-Tribromopyrazole-1-acetate

A quantity (92 gm., 0.3 mole) 3,4,5-tribromopyrazole was added with vigorous stirring to a solution of 7.1 gm. sodium (0.31 mole) in 300 ml. absolute ethanol. After the mixing was complete, 100 gm. (0.6 mole) ethyl bromoacetate was added dropwise while stirring was continued. The mixture was diluted with 200 ml. absolute ethanol and this reaction mixture was stirred at about 25° C. for about 18 hrs. After removing most of the ethanol by evaporation under reduced pressure, 100 ml. 6 N hydrochloric acid was added to the residue, and this aqueous acid mixture was made alkaline with solid sodium carbonate. The aqueous layer was separated and extracted with three 60-ml. portions of ether. The ether extracts were combined, washed with three 40-ml. portions of water, and dried with anhydrous magnesium sulfate. After removing the ether by evaporation under reduced pressure, there was obtained a white solid. Recrystallization from technical hexane (Skellysolve B, a mixture of isomeric hexanes having a boiling range between 61° and 69° C.) gave 96.0 gm. of ethyl 3,4,5-tribromopyrazole-1-acetate having a melting point at 101° to 103° C.

Analysis:
  Calc'd. for $C_7H_7Br_3N_2O_2$:
    C, 21.51; H, 1.81; N, 7.17; Br, 61.33.
  Found: C, 21.79; H, 1.62; N, 6.96; Br, 61.56.

Following the same procedure, but substituting methyl 2-bromopropionate, ethyl 3-bromopropionate, ethyl 4-bromobutyrate, ethyl 2-bromohexanoate, ethyl 2-bromooctanoate, ethyl 2-bromo-decanoate, ethyl 2-bromododecanoate, ethyl 2-bromo-4-methylpentanoate and ethyl 2-bromo-9-dodecylenate for ethyl bromoacetate, there are prepared:
methyl 3,4,5-tribromo-α-methylpyrazole-1-acetate, ethyl 3,4,5-tribromopyrazole-1-propionate, ethyl 3,4,5-tribromopyrazole-1-butyrate, ethyl 3,4,5-tribromo-α-butylpyrazole-1-acetate, ethyl 3,4,5-tribromo-α-hexylpyrazole-1-acetate, ethyl 3,4,5-tribromo-α-octylpyrazole-1-acetate, ethyl 3,4,5-tribromo-α-decylpyrazole-1acetate, ethyl 3,4,5-tribromo-α-isobutylpyrazole-1-acetate, and ethyl 3,4,5-tribromo-α-(7-decenyl)pyrazole-1-acetate, respectively.

Preparation 2 — Preparation of 3,4,5-Tribromopyrazole-1-propionic acid

A mixture consisting of 9.1 gm. (0.03 mole) 3,4,5-tribromopyrazole and 8.1 gm. (0.045 mole) ethyl 3-bromopropionate was heated at 140° C. for 24 hrs. in an atmosphere of nitrogen. After cooling, 80 ml. 0.5 N aqueous sodium hydroxide was added to the reaction mixture and it was heated at the reflux temperature for 3 hrs. After cooling again and adding 1 N aqueous hydrochloric acid until the mixture was pH 2, a precipitate formed. The precipitate was collected on a filter and recrystallized from a mixture of ether and technical hexane. There was thus obtained 10.1 gm. 3,4,5-tribromopyrazole-1-propionic acid having a melting point at 112° to 113° C.

Analysis:
  Calc'd. for $C_6H_5Br_3N_2O_2$:
    C, 19.12; H, 1.33; N, 7.43; Br, 63.61.
  Found: C, 19.31; H, 1.54; N, 7.44; Br, 64.05.

Following the same procedure, but substituting 3,5-dichloropyrazole, 3,4,5-triiodopyrazole, 3,4-dibromopyrazole, and 3,5-dibromo-4-chloropyrazole for 3,4,5-tribromopyrazole, there are prepared the corresponding: 3,5-dichloropyrazole-1-propionic acid, 3,4,5-triiodopyrazole-1-propionic acid, 3,4-dibromopyrazole-1-propionic acid, and 3,5-dibromo-4-chloropyrazole-1-propionic acid, respectively.

Preparation 3 — Preparation of 3,4,5-Tribromopyrazole-1-acetic acid

A suspension of 3.9 gm. (0.01 mole) ethyl 3,4,5-tribromopyrazole-1-acetate (prepared in Preparation 1) in 20 ml. 0.5 N aqueous sodium hydroxide was heated at the reflux temperature for 2 hrs. The reaction mixture became a clear solution and was cooled. After dilution with 50 ml. water and acidification to pH 2 with 1 N hydrochloric acid, a white precipitate formed. The precipitate was collected on a filter, washed thoroughly with water and recrystallized from a mixture of ethanol and water. There was thus obtained 2.6 gm. 3,4,5-tribromopyrazole-1-acetic acid having a melting point of 212° to 215° C.

Analysis:
  Calc'd. for $C_5H_3Br_3N_2O_2$:
    C, 16.55; H, 0.83; N, 7.72; Br, 66.08.
  Found: C, 16.62; H, 0.89; N, 7.81; Br, 65.88.

Preparation 4 — Preparation of Ethyl 3,4,5-Tribromo-α-methylpyrazole-1-acetate

Following the procedure of Preparation 1, but substituting ethyl 2-bromopropionate for ethyl bromoacetate, there was prepared ethyl 3,4,5-tribromo-α-methylpyrazole-1-acetate having a melting point at 64° to 66° C.

Analysis:
  Calc'd. for $C_8H_9Br_3N_2O_2$:
    C, 23.73; H, 2.24; N, 6.92; Br, 59.21.
  Found: C, 23.88; H, 2.55; N, 6.98; Br, 59.07.

Preparation 5 — Preparation of 3,4,5-Tribromo-α-methylpyrazole-1-acetic acid

Following the procedure of Preparation 3, but substituting ethyl 3,4,5-tribromo-α-methylpyrazole-1-acetate (prepared in Preparation 4) for ethyl 3,4,5-tribromopyrazole-1-acetate, there was prepared 3,4,5-tribromo-α-methylpyrazole-1-acetic acid having a melting point at 162° to 163.5° C.

Analysis:
  Calc'd. for $C_6H_5Br_3N_2O_2$:
    C, 19.12; H, 1.34; N, 7.43; Br, 63.61.
  Found: C, 19.27; H, 1.45; N, 7.34; Br, 63.74.

Preparation 6 — Preparation of 3,4,5-Tribromopyrazole-1-butyric acid

Following the procedure of Preparation 2, but substituting ethyl 4-bromobutyrate for ethyl 3-bromopropionate, there was prepared 3,4,5-tribromopyrazole-1-butyric acid having a melting point at 128.5° to 130° C.

Analysis:
  Calc'd. for $C_7H_7Br_3N_2O_2$:
    C, 21.51; H, 1.81; N, 7.17; Br, 61.33.
  Found: C, 21.98; H, 1.98; N, 7.26; Br, 61.45.

Preparation 7

Following the procedure of Preparation 2, but substituting ethyl 2-bromo-3-butenoate and ethyl 3-bromo-2-methylpropionate for ethyl 3-bromopropionate, there are prepared 3,4,5-tribromo-α-vinylpyrazole-1-acetic acid and 3,4,5-tribromo-α-methylpyrazole-1-propionic acid, respectively.

Preparation 8 — Preparation of 3,4,5-Tribromo-α-methylpyrazole-1-acetic acid

A quantity (3.04 gm., 0.01 mole) of 3,4,5-tribromopyrazole was dissolved in 70 ml. acetone and 2.76 gm. (0.02 mole) solid anhydrous potassium carbonate was added. The mixture was heated at the reflux temperature with stirring for 10 minutes and, after cooling, 2.0 gm. (0.011 mole) ethyl 2-bromopropionate was added. This reaction mixture was heated at the reflux temperature for 1½ hrs. After cooling, an aqueous solution of sodium hydroxide (0.5 gm. in 90 ml. water) was added. The acetone was distilled off and the remaining aqueous solution was heated at the reflux temperature for 2 hrs. The clear solution thus obtained was cooled and acidified to about pH 2 with 2 N hydrochloric acid. A white precipitate that formed was collected on a filter, washed with water, and dried. There was thus obtained 3.55 gm. (95 percent yield) of 3,4,5-tribromo-α-methylpyrazole-1-acetic acid having a melting point at 162° to 164° C., identical with the product of Preparation 5.

Analysis:
Calc'd. for $C_6H_5Br_3N_2O_2$:
C, 19.12; H, 1.34; N, 7.43; Br, 63.61.
Found: C, 19.24; H, 1.55; N, 7.11; Br, 63.71.

Preparation 9 — Preparation of 3,4,5-Tribromo-α-ethylpyrazole-1-acetic acid

Following the procedure of Preparation 8, but substituting ethyl 2-bromobutyrate for ethyl 2-bromopropionate, there was prepared 3,4,5-tribromo-α-ethylpyrazole-1-acetic acid having a melting point at 98° to 100° C.

Analysis:
Calc'd. for $C_7H_7Br_3N_2O_2$:
C, 21.51; H, 1.81; N, 7.17; Br, 61.33.
Found: C, 21.68; H, 1.69; N, 6.86; Br, 61.46.

Preparation 10 — Preparation of 3,4,5-Tribromo-α-isopropylpyrazole-1-acetic acid Following the same procedure as Preparation 8, but substituting ethyl 2-bromo-3-methylbutyrate for ethyl 2-bromopropionate, there was prepared 3,4,5-tribromo-α-isopropylpyrazole-1-acetic acid having a melting point at 92° to 95° C.

Analysis:
Calc'd. for $C_8H_9Br_3N_2O_2$:
C, 23.73; H, 2.24; N, 6.92; Br, 59.21.
Found: C, 23.82; H, 2.14; N, 6.71; Br, 59.41.

Preparation 11 — Preparation of 3,4,5-Tribromo-α-butylpyrazole-1-acetic acid

Following the same procedure as Preparation 8, but substituting ethyl 2-bromohexanoate for ethyl 2-bromopropionate, there was prepared 3,4,5-tribromo-α-butylpyrazole-1-acetic acid having a melting point at 90° to 92° C.

Analysis:
Calc'd. for $C_9H_{11}Br_3N_2O_2$:
C, 25.80; H, 2.65; N, 6.69; Br, 57.23.
Found: C, 25.93; H, 2.79; N, 6.58; Br, 57.31.

Preparation 12 — Preparation of Ethyl 3,4,5-Tribromo-α-butylpyrazole-1-acetate

A quantity (30.4 g., 0.1 mole) of 3,4,5-tribromopyrazole was dissolved in 500 ml. acetone and 27.6 g. (0.2 mole) solid anhydrous potassium carbonate was added. The mixture was heated at the reflux temperature with stirring for 10 minutes and after cooling 23.0 g. (0.11 mole) ethyl 2-bromohexanoate was added. This reaction mixture was heated at the reflux temperature for 1½ hrs., cooled, and then filtered. The solids on the filter were washed with acetone and the combined acetone filtrate and acetone washes were evaporated to dryness under reduced pressure. Distillation of the residue yielded ethyl 3,4,5-tribromo-α-butylpyrazole-1-acetate, 41.0 g. (92 percent yield), having a boiling point at 138° to 140° C. at 0.15 mm. mercury pressure.

Analysis:
Calc'd. for $C_{11}H_{15}Br_3N_2O_2$:
C, 29.55; H, 3.38; N, 6.27; Br, 53.64.
Found: C, 29.93; H, 3.67; N, 6.13; Br, 53.95.

Preparation 13 — Preparation of Ethyl 3,4,5-Tribromo-α-ethylpyrazole-1-acetate

Following the same procedure as Preparation 12, but substituting ethyl 2-bromobutyrate for ethyl 2-bromohexanoate, there was prepared ethyl 3,4,5-tribromo-α-ethylpyrazole-1-acetate.

Analysis:
Calc'd. for $C_9H_{11}Br_3N_2O_2$:
C, 25.80; H, 2.65; N, 6.69; Br, 57.23.
Found: C, 26.35; H, 2.88; N, 6.63; Br, 57.04.

Preparation 14 — Preparation of Ethyl 3,4,5-Tribromo-α-isopropylpyrazole-1-acetate Following the same procedure as Preparation 12, but substituting ethyl 2-bromo-3-methylbutyrate for ethyl 2-bromohexanoate, there was prepared ethyl 3,4,5-tribromo-α-isopropylpyrazole-1-acetate having a boiling point at 119° C. at 0.05 mm. mercury pressure.

Preparation 15 — Preparation of 3,5-Dibromopyrazole-1-ethanol

A solution of 9.7 g. (0.025 mole) ethyl 3,4,5-tribromopyrazole-1-acetate in 125 ml. dry ether was mixed with a suspension of 1.9 g. (0.05 mole) lithium aluminum hydride in 50 ml. dry ether. The reaction mixture was heated at the reflux temperature for 2 hrs. and then cooled. Ethyl acetate (5 ml.) and then water (30 ml.) were added and after settling the ether portion was decanted. The ether solution was washed with two 40-ml. portions of water and dried over anhydrous sodium sulfate. After removing the ether by evaporation, the oily residue was treated with decolorizing charcoal and crystallized from a mixture of ethyl ether and petroleum ether (boiling at the temperature range 30° C. to 60° C.). There was thus obtained 6.5 gms. (75 percent yield) of 3,5-dibromopyrazole-1-ethanol having a melting point of 64° to 66° C.

Analysis:
Calc'd. for $C_5H_6Br_2N_2O$:
C, 22.24; H, 2.24; N, 10.37; Br, 59.20.
Found: C, 22.63; H, 2.54; N, 10.52; Br, 59.01.

Preparation 16 — Preparation of 3,5-Dibromo-α-methylpyrazole-1-ethanol

Following the procedure of Preparation 15, but substituting ethyl 3,4,5-tribromo-α-methylpyrazole-1acetate for ethyl 3,4,5-tribromopyrazole-1-acetate, there was prepared 3,5-dibromo-α-methylpyrazole-1-ethanol having a melting point at 83.5° to 84.5° C.

Analysis:
Calc'd. for $C_6H_8Br_2N_2O$:
C, 25.38; H, 2.84; N, 9.87; Br, 56.28.
Found: C, 25.53; H, 2.92; N, 9.65; Br, 55.85.

Preparation 17 — Preparation of 3,5-Dibromo-α-methylpyrazole-1acetic acid

To a suspension of 3,5-dibromo-α-methylpyrazole-1-ethanol (2.8 g., 0.01 mole) in sodium hydroxide (0.3 g., 0.0075 mole) and water (3.0 ml.), a solution of potassium permanganate (3.4 g., 0.0215 mole) in water (30 ml.) was added over a period of 20 minutes. A further 30 ml. of water was added and the reaction mixture was stirred at about 25° C. for 4 hours, followed by acidification with 6N sulfuric acid and addition of sodium bisulfite until all the precipitated manganese dioxide went into solution. The aqueous solution was extracted with three 50-ml. portions of ether and the combined ether extracts were washed with water and dried over anhydrous sodium sulfate. Evaporation of the ether under reduced pressure followed by chromatography on silica gel using the solvent system benzene, 85: chloroform, 10: glacial acetic acid, 5 (by volume) gave a solid which on recrystallization from acetone-hexane gave 3,5-dibromo-α-methylpyrazole-1-acetic acid having a melting point at 124.5° to 126° C.

Analysis:
Calc'd. for $C_6H_6Br_2N_2O_2$:
C, 24.18; H, 2.03; N, 9.40; Br, 53.64.
Found: C, 23.98; H, 2.06; N, 9.63; Br, 53.97.

Following the same procedure, but substituting 3,5-dibromopyrazole-1-ethanol for 3,5-dibromo-α-methylpyrazole-1-ethanol, there is prepared 3,5-dibromopyrazole-1-acetic acid.

EXAMPLE 1 — Preparation of 2-(diethylamino)ethyl 3,4,5-tribromopyrazole-1-acetate and hydrochloride thereof A mixture of 3,4,5-tribromopyrazole-1-acetic acid (12.4 gm., 0.034 mole) and thionyl chloride (10 ml.) was heated at the reflux temperature for 3 hrs., followed by removal of excess thionyl chloride under reduced pressure. An aliquot (0.0204 mole) of the resulting 3,4,5-tribromopyrazole-1-acetyl chloride in 60 ml. toluene was added dropwise during 30 min. to a solution of 2-(diethylamino)ethanol (0.0204 mole) in 100 ml. toluene. The mixture was heated at the reflux temperature for 30 min. and was then cooled, filtered, and dried. The 2-(diethylamino)ethyl 3,4,5-tribromopyrazole-1-acetate hydrochloride thus obtained weighed 8.5 g. (85 percent yield) and had a melting point at 166.5° to 168.5° C. The compound after recrystallization from a mixture of chloroform and technical hexane had a melting point at 170.5° to 171° C.

Analysis:
Calc'd. for $C_{11}H_{16}Br_3N_3O_2.HCl$:
C, 26.50; H, 3.43; N, 8.43.
Found: C, 26.66; H, 3.61; N, 8.39.

2-(Diethylamino)ethyl 3,4,5-tribromopyrazole-1-acetate is obtained by neutralizing an aqueous solution of the above hydrochloride with aqueous sodium carbonate solution, extracting the mixture with ether, and removing the ether by evaporation.

EXAMPLE 2 — Preparation of 2-(diethylamino)ethyl 3,4,5-tribromo-α-methylpyrazole-—1-acetate and salts thereof Following the procedure of Example 1, but substituting 3,4,5-tribromo-α-methylpyrazole-1-acetic acid for 3,4,5-tribromopyrazole-1-acetic acid, there was obtained 2-(diethylamino)ethyl 3,4,5-tribromo-α-methylpyrazole-1-acetate hydrochloride which after recrystallization from a mixture of acetone and hexane had a melting point at 142° to 144° C.

Analysis:
Calc'd. for $C_{12}H_{18}Br_3N_3O_2.HCl$:
C, 28.12; H, 3.74; N, 8.20.
Found: C, 28.37; H, 3.80; N, 8.09.

2-(Diethylamino)ethyl 3,4,5-tribromo-α-methylpyrazole-1-acetate is obtained by neutralizing an aqueous solution of the above hydrochloride with aqueous sodium carbonate solution, extracting the mixture with ether, and removing the ether by evaporation.

By neutralizing an ether solution of 2-(diethylamino)ethyl 3,4,5-tribromo-α-methylpyrazole-1-acetate with a stoichiometric amount of ethereal hydrogen bromide and evaporating the mixture to dryness, 2-(diethylamino)ethyl 3,4,5-tribromo-α-methylpyrazole-1-acetate hydrobromide is obtained.

Similarly, by substituting other acids for hydrogen bromide, there can be prepared the sulfate, the nitrate, the acetate, the trichloroacetate, the benzoate, the salicylate, the maleate, the methanesulfonate and the picrate of 2-(diethylamino)ethyl 3,4,5-tribromo-α-methylpyrazole-1-acetate.

EXAMPLE 3 — Preparation of 2-(diethylamino)ethyl 3,4,5-tribromo-α-methylpyrazole-1-acetate methiodide A solution of 2-(diethylamino)ethyl 3,4,5-tribromo-α-methylpyrazole-1-acetate (0.2 mole) in diethyl ether (75 ml.) is treated with methyl iodide (0.4 mole) and left standing at room temperature for several days. The resulting precipitate is filtered and dried. There is thus obtained 2-(diethylamino)-ethyl 3,4,5-tribromo-α-methylpyrazole-1-acetate methiodide.

Similarly, but replacing methyl iodide with ethyl bromide, propyl chloride, benzyl chloride and allyl bromide, there are obtained 2-(diethylamino)ethyl 3,4,5-tribromo-α-methylpyrazole-1-acetate ethobromide, propyl chloride, benzyl chloride and allyl bromide, respectively.

EXAMPLE 4

Following the procedure of Example 1, but substituting 2-(dimethylamino)ethanol, 2-(dipropylamino)ethanol, 2-(dibutylamino)ethanol, 2-diethylamino-1-methylethanol, 3-diethylamino-1-propanol, 4-diethylamino-1-butanol, 2-morpholinoethanol, 2-piperidinoethanol, 2-pyrrolidinoethanol, 2-(4-methylpiperazino)ethanol, 8-hexamethyleneimino-1-octanol, 3-thiomorpholino-1-propanol, 2-(diallylamino)ethanol, 2-(dicyclohexylamino)-ethanol and 5-methylbenzylamino-1-pentanol for 2-(diethylamino)-ethanol, there are prepared the 2-(dimethylamino)ethyl, 2(dipropylamino)ethyl, 2-(dibutylamino)ethyl, 2-diethylamino-1-methylethyl, 3-(diethylamino)propyl, 4-(diethylamino)butyl, 2-morpholinoethyl, 2-piperidinoethyl, 2-pyrrolidinoethyl, 2-(4-methylpiperazino)ethyl, 8-hexamethyleneiminooctyl, 3-thiomorpholinopropyl, 2-(diallylamino)ethyl, 2-(dicyclohexylamino)ethyl and 5-(methylbenzylamino)-pentyl esters, respectively, of 3,4,5-tribromo-α-methylpyrazole-1-acetic acid, first as the hydrochlorides and then as the free bases.

EXAMPLE 5

Following the procedure of Example 1, but substituting
3,4,5-tribromopyrazole-1-propionic acid,
3,4,5-tribromopyrazole-1-butyric acid,
3,4,5-tribromo-α-vinylpyrazole-1-acetic acid,
3,4,5-tribromo-α-methylpyrazole-1-propionic acid,
3,4,5-tribromo-α-ethylpyrazole-1-acetic acid,
3,4,5-tribromo-α-isopropylpyrazole-1-acetic acid,
3,5-dibromo-α-methylpyrazole-1-acetic acid,
3,5-dichloropyrazole-1-propionic acid,
3,4,5-triiodopyrazole-1-propionic acid,
3,4-dibromopyrazole-1-propionic acid, and
3,5-dibromo-4-chloropyrazole-1-propionic acid for 3,4,5-tribromopyrazole-1-acetic acid, there are prepared the 2-(diethylamino)ethyl esters of the respective acids, first as the hydrochlorides and then as the free bases.

The new aminoalkyl esters of di- and trihalopyrazole-1-alkanoic and -1-alkenoic acids of this invention (compounds of Formula I) have been found to be active as herbicides and plant growth regulators. The new compounds can be used to prevent damage to field crops due to weed competition, and they can be used to prevent unsightly and deleterious growths of weeds on home lawns, golf courses, cemeteries, railroad rights-of way, and parks.

Compounds of this invention have been found to be highly active against both broadleaf and grassy weeds, with some variations between one compound and another within the series. Illustratively, 2-(diethylamino)ethyl ester of 3,4,5-tribromopyrazole-1-acetic acid and 2-(diethylamino)ethyl ester of 3,4,5-tribromo-α-methylpyrazole-1-acetic acid are especially active against various weeds, e.g., crabgrass (*Digitaria sanguinalis* L.), yellow foxtail (*Setaria glauca* L.), wild oats (*Avena fatua* L.), bindweed (*Convolvulus arvensis* L.), Johnson grass (*Sorghum halepense* L.), buckhorn plantain (*Plantago lanceolata* L.), curly dock (*Rumex crispus* L.), wild mustard (*Brassica kaber* DG.), purslane (*Portulaca oleracea* L.), and barnyard-grass (*Echinochloa crusgalli* L.).

Illustratively, control and significant growth retardation of the foregoing weed species has been achieved using the named compounds and other specific compounds of this invention at rates of from 1 to 12.5 lbs. per acre. Depending upon the kinds of weeds to be controlled, the stage of weed development, the degree of infestation, and the presence or absence of aesthetic or crop plants, the compounds of this invention can be applied to soil, germinating weed seeds, weed seedlings, plant growth media, growing plants, or any other selected situs for control of weeds at rates ranging from about ¼ to ½ lb. per acre up to about 50 lbs. per acre. Ordinarily, the situs will be soil, but this term is used in the broad sense — anywhere where weed growth might be a problem, e.g., gravel driveways, railroad beds, flat built-up roofs, ponds, lakes, streams, and canals. Aquatic applications effectively use about 2 to about 10,000 or more, parts per million (ppm), by weight.

The new aminoalkyl esters of di- and trihalopyrazole-1-alkanoic and -1-alkenoic acids of Formula I can be applied to a situs in a dispersible pure form, but dispersible formulations for herbicidal use are preferred. The dispersible formulations of this invention comprise an aminoalkyl ester of di- and trihalopyrazole-1-alkanoic and -1-alkenoic acids in a homogeneous, dispersible form with a homogeneous dispersible carrier. Adjuvants such as surfactants, humectants, dispersants, adhesive or sticking agents, corrosion inhibitors, and antifoaming agents can be included.

A homogeneous dispersible carrier comprehends a particulate solid carrier or a liquid carrier diluent. The compound can be dispersed in a liquid carrier diluent as a solute or as finely divided particles (suspension).

The term "dispersible," as used in this specification and in the claims, means matter in a liquid or particulate state such that it can be evenly distributed over a given area or metered into a body of water. A "liquid" state includes true solutions as well as dispersions of particulate solids in a liquid. Emulsions of one liquid in another, e.g., oil-in-water, are also contemplated. The active compound can be in either the dispersed phase, the continuous phase, or partitioned between them both. In general, the active compound will be preponderantly in the dispersed phase when emulsions are used. A "particulate" state includes the general concept of finely divided separate particles, and granular particles as large as 10 mesh (U.S.) or even somewhat larger when appropriate herbicidal practice indicates an advantage in using larger granules.

The granular particles could be included in what is termed an "interstitial" state, which contemplates the deposition or entrapment of the active compound within the interstices of a porous body. For example, the compounds can be mixed with an elastomer, e.g., natural rubber, chloroprene, butyl rubber, polyether and polyester urethanes and the like, which may be further processed according to conventional techniques in the elastomeric art. The latter elastomeric matrices as well as conventional granules provide a slow, sustained release of the active herbicide so that herbicidal concentrations of the active compound can be obtained over a prolonged interval for the control of weeds.

Illustrative of the adjuvants named above, humectants include glycerol, diethylene glycol, solubilized ligninns (such as calcium ligninsulfonate), and the like. Dispersants include methyl cellulose, polyvinyl alcohol, sodium ligninsulfonate, and the like. Adhesive or sticking agents include vegetable oils, naturally occurring gums, casein, and the like. A suitable corrosion inhibitor is epichlorohydrin, and a suitable anti-foaming agent is stearic acid.

Representative surfactants include alkyl sulfates and sulfonates, alkyl aryl sulfonates, sulfosuccinate esters, polyoxyethylene sulfates, polyoxyethylene-sorbitan monolaurate, alkyl aryl polyether sulfates, alkyl aryl polyether alcohols, alkyl naphthalene sulfonates, alkyl quaternary ammonium salts, sulfated fatty acids and esters, sulfated fatty acid amides, glycerol mannitan laurate, polyalkylether condensates of fatty acids, lignin sulfonates, and the like. The preferred class of surfactants includes blends of sulfonated oils and polyalcohol carboxylic acid esters (Emcol H-77), blends of polyoxyethylene ethers and oil-soluble sulfonates (Emcol H-400), blends of alkyl aryl sulfonates and alkylphenoxy polyethoxy ethanols (Tritons X-151, X-161, and X-171), e.g., about equal parts of sodium kerylbenzene sulfonate and isooctylphenoxy polyethoxy ethanol containing about 12 ethoxy groups, and blends of calcium alkyl aryl sulfonates and polyethoxylated vegetable oils (Agrimul $N_4S$). It will be understood, of course, that the sulfate and sulfonate surfactants suggested above will preferably be used in the form of their soluble salts, for example, their sodium salts. All of these surfactants are capable of reducing the surface tension of water to less than about 40 dynes per centimeter in concentrations of about 1 percent or less. The dispersible powder formulations can be prepared with a mixture of surfactants of the types indicated if desired.

The concentration of the active compound, a new aminoalkyl ester of a di- or trihalopyrazole-1-alkanoic or -1-alkenoic acids according to this invention, the hew herbicidal formulations of this invention is not usually a critical, limiting factor in achieving a desired herbicidal effect. The most important factor is how much compound is applied to an area of weeds to be controlled. It is readily apparent that one can apply a large amount of a formulation having a low concentration of active compound or a relatively small amount of a formulation having a high concentration. Whether a low or high concentration should be used depends upon the mode of application, the amount and kinds of vegetation, and the thoroughness of coverage desired. The total amount to be applied depends upon the kinds of weeds and crop, if any, the severity of infestation, the stage of plant development, and the season of the year.

Representative homogeneous dispersible formulations according to this invention include sprays, dusts, and granular formulations. Spray formulations are preferred for foliar applications and for uniformly controlled applications to a soil. Granular formulations are usually applied in bands spanning the seeded row, although broadcast distribution is advantageous when soil incorporation is practiced and a prolonged effect is desired.

The spray formulations in accordance with the invention can be aqueous solutions, aqueous suspension, water-in-oil emulsions, oil-in-water emulsions, and oil solutions. The spray formulations will conveniently comprise from about 0.1 percent or lower to about 50 percent by weight or even higher, a volume of spray being applied so that a herbicidally effective amount of aminoalkyl esters of di- and trihalopyrazole-1-alkanoic and -1-alkenoic acids is distributed over the treated area. Sprays containing about 0.25 ounce to about 16 lbs. of aminoalkyl esters of di- and trihalopyrazole-1-alkanoic and -1-alkenoic acids in a 20 gal. to 40 gal. volume are applied to foliage or soil for effective herbicidal action.

Concentrates for preparing spray formulations are advantageously prepared by dissolving the active compounds of the invention in a solvent, or by dispersing the active compounds in a dispersible solid or liquid carrier diluent. Illustratively, the herbicidally active aminoalkyl esters of di- and trihalopyrazole-1-alkanoic and -1-alkenoic acids of this invention are dissolved or dispersed in water or a suitable water-miscible or water-immiscible inert organic liquid. Representative water-miscible organic liquids include acetone, methyl ethyl ketone, dimethylformamide, alcohols, monoalkyl ethers of ethylene glycol, ethyl acetate, and the like. Representative substantially water-immiscible organic liquids (i.e., a solvent carrier which is soluble in water to the extent of less than 2.5 percent by volume at temperatures of the order of 20° to 30° C.) for preparing emulsifiable concentrates include petroleum oils, distillates, toluene, xylene, cumene, and like aromatic hydrocarbons, isoparaffin oil, mineral oil, and the like.

Advantageously, the concentration of active ingredient in the emulsifiable concentrates (with or without surfactant) can range from about 5 percent to about 50 percent by weight, preferably from about 10 percent to about 40 percent. A concentrate comprising 20 percent (by weight) of the compound dissolved in a water-immiscible solvent of the kind noted above can be admixed with an aqueous medium in the proportions of 13 ml. of concentrate with 1 gal. of medium to give a mixture containing 700 parts of active ingredient per million parts of liquid carrier. Similarly, 1 qt. of a 20 percent concentrate mixed with 40 gals. of water provides about 1,200 ppm (parts per million) of active ingredient. In the same manner, more concentrated solutions of active ingredient can be prepared.

Dust formulations in accordance with the invention are readily prepared by dispersing the active compound in a dispersible solid by grinding a mixture of the compound and a pulverulent solid carrier in the presence of each other. Grinding is conveniently accomplished in a ball mill, a hammermill, or by air-blast micronization. These dust compositions can also be prepared by dissolving the aminoalkyl esters of di- and trihalopyrazole-1-alkanoic and -1-alkenoic acids in a volatile solvent such as methylene chloride, mixing the solution with a pulverulent solid carrier, evaporating the solvent, and pulverizing the impregnated carrier. A suitable ultimate particle size is less than 60 microns. Preferably, 95 percent of the particles are less than 50 microns, and about 75 percent are 5 to 20 microns. Dusts of this degree of comminution are conveniently free-flowing. Dusts are particularly adapted for air-borne application over ponds, lakes, marshes, swamps, swales, and potholes.

Representative suitable pulverulent solid carriers include the natural clays such as China, Georgia, Barden, attapulgus, kaolin, and bentonite clays; minerals in their natural forms as they are obtained from the earth such as talc, pyrophyllite, quartz, diatomaceous earth, fuller's earth, chalk, rock phosphates and sulfates, calcium carbonates, sulfur, silica and silicates; chemically modified minerals such as washed bentonite, precipitated calcium phosphate, precipitated calcium carbonate, precipitated calcium silicate, synthetic magnesium silicate, and colloidal silica; and organic flours such as wood, walnut shell, soybean, cottonseed, and tobacco flours, and free-flowing, hydrophobic starches.

The proportions of pulverulent carrier and aminoalkyl esters of di- and trihalopyrazole-1-alkanoic and -1-alkenoic acids can vary over a wide range depending upon the plants to be controlled, rates of application according to equipment available, and the conditions of treatment. In general, dust formulations can contain up to about 90 percent (on a weight basis) of the active ingredient. Dusts having as little as 0.001 percent of the active ingredient can be used, but a generally preferred proportion is from about 0.50 percent to about 20 percent of active ingredient.

Advantageously, a dust formulation as described above includes a surfactant, because about 0.1 percent to about 12 percent of a surfactant promotes dispersibility of a dust in water and facilitates formulation of aqueous sprays of dispersibility of a dust formulation applied directly to water surfaces or aquatic weeds. Dust formulations comprising a surfactant are known as dispersible or wettable powders. As indicated, dispersible or wettable powders can be admixed with water to obtain any desired concentration of active ingredient. The dispersible or wettable powders can conveniently comprise from about 10 percent to about 90 percent active ingredient, preferably about 30 percent to about 80 percent.

A suitable dispersible powder formulation is obtained by blending and milling 327 lbs. of Georgia Clay, 4.5 lbs. of isooctylphenoxy polyethoxy ethanol (Triton X-100) as a wetting agent, 9 lbs. of a polymerized sodium salt of substituted benzoid long-chain sulfonic acid (Daxad 27) as a dispersing agent, and 113 lbs. of the active ingredient. The resulting formulation has the following percentage composition (parts herein are by weight unless otherwise specified):

| | |
|---|---|
| Active ingredient | 25% |
| Isooctylphenoxy polyethoxy ethanol | 1% |
| Polymerized sodium salt of substituted benzoid long-chain sulfonic acid | 2% |
| Georgia Clay | 72% |

This formulation, when dispersed in water at the rate of 10 lbs. per 100 gals., gives a spray formulation containing about 0.3 percent (3,000 ppm) active ingredient which can be applied to weeds at the rate of 40 gals. per acre to give a total application of active ingredient of 1 lb. per acre.

The new aminoalkyl esters of di- and trihalopyrazole-1-alkanoic and -1-alkenoic acids of this invention, more particularly, 2-(diethylamino)ethyl ester of 3,4,5-tribromopyrazole-1-acetic acid, possess advantageous plant growth regulatory activity and they modify the normal apical dominance and produce symptoms of epinasty when applied to growing plants. They can be used to promote lateral bud growth and increased numbers of fruiting bodies.

Further in accordance with this invention, certain formulations of the new aminoalkyl esters of di- and trihalopyrazole-1-alkanoic and -1-alkenoic acids of this invention with oil are particularly efficacious, and herbicidal action of the compound is improved. Any petroleum oil can be used so long as it is not so viscous as to be too difficult to disperse. A non-phytotoxic oil is satisfactory.

Advantageously, a 50 percent wettable powder of the herbicidal active ingredient is mixed with about 38 gals. water and 2 gals. oil for spray application. Alternatively, about 2 gals. oil and a 50 percent wettable powder are premixed and then dispersed in about 38 gals. water for spray application. In field tests, oil formulations of the foregoing type have given improved herbicidal action.

We claim:

1. The method of controlling weeds and regulating the growth of plants which comprises applying to a situs and to growing plants a herbicidally effective and growth regulatory amount of a 2-(dialkylamino)-alkyl ester of a 3,4,5-tribromopyrazole-1-alkanoic acid of the formula:

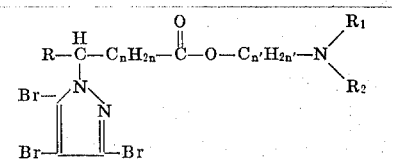

wherein $n$ is an integer 0, 1, 2, or 3; $R$ is hydrogen, alkyl of from one to 10 carbon atoms, inclusive; the sum of the carbon atoms in the group

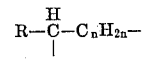

being not more than 11; "$-C_{n'}H_{2n'}-$" is alkylene of from two to eight carbon atoms, inclusive ($n'$ being an integer from two to eight, inclusive); and $R_1$ and $R_2$ are lower-alkyl of from one to eight carbon atoms, inclusive.

2. The method according to claim 1 wherein 2-(diethylamino)-ethyl ester of 3,4,5-tribromopyrazole-1-acetic acid is used.

3. The method according to claim 1 wherein 2-(diethylamino)-ethyl ester of 3,4,5-tribromo-α-methyl-pyrazole-1-acetic acid is used.

4. Formulations for weed control and plant growth regulation comprising a dispersible carrier and a herbicidally effective and plant growth regulatory amount of a 2-(dialkylamino)alkyl ester of a 3,4,5-tribromopyrazole-1-alkanoic acid of the formula:

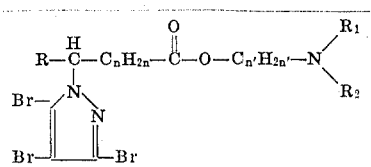

wherein $n$ is an integer 0, 1, 2, or 3; $R$ is hydrogen, alkyl of from one to 10 carbon atoms, inclusive; the sum of the carbon atoms in the group

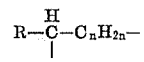

being not more than 11; "$-C_{n'}H_{2n'}-$" is alkylene of from two to eight carbon atoms, inclusive ($n'$ being an integer from two to eight, inclusive); and $R_1$ and $R_2$ are lower-alkyl of from one to eight carbon atoms, inclusive.

5. Formulations according to claim 1 wherein the compound is 2-(diethylamino)ethyl ester of 3,4,5-tribromopyrazole-1-acetic acid.

6. Formulations according to claim 1 wherein the compound is 2-(diethylamino)ethyl ester of 3,4,5-tribromo-α-methylpyrazole-1-acetic acid.

* * * * *

UNITED STATES PATENT OFFICE
CERTIFICATE OF CORRECTION

Patent No. 3,849,106     Dated November 19, 1974

Inventor(s) Gabriel Kornis, Arnolds Steinhards, Eldon George Nidy, and Henry J. Vostral It is certified that error appears in the above-identified patent and that said Letters Patent are hereby corrected as shown below:

Column 10, line 68, for "H, 2.54;" read -- H, 2.45; --.
Column 19, line 3, claim 5, for "claim 1" read -- claim 4 --.
Column 20, line 1, claim 6, for "claim 1" read -- claim 4 --.

Signed and sealed this 20th day of May 1975.

(SEAL)
Attest:

RUTH C. MASON
Attesting Officer

C. MARSHALL DANN
Commissioner of Patents
and Trademarks